W. S. BARNICKEL.
TREATMENT OF CRUDE OIL.
APPLICATION FILED NOV. 19, 1914.
1,223,659.
Patented Apr. 24, 1917.
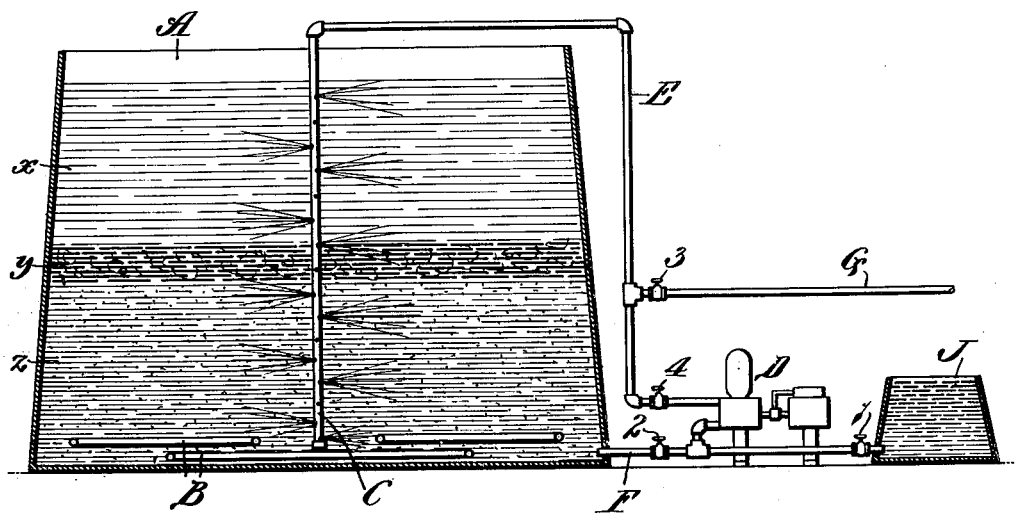

UNITED STATES PATENT OFFICE.

WILLIAM S. BARNICKEL, OF ST. LOUIS, MISSOURI.

TREATMENT OF CRUDE OIL.

1,223,659.  Specification of Letters Patent.  Patented Apr. 24, 1917.

Application filed November 19, 1914. Serial No. 873,061.

*To all whom it may concern:*

Be it known that I, WILLIAM S. BARNICKEL, a citizen of the United States, residing at St. Louis, Missouri, have invented a certain new and useful Improvement in the Treatment of Crude Oil, of which the following is a full, clear, and exact description, such as will enable others skilled in the art to which it appertains to make and use the same.

This invention relates to the treatment of crude oil, and particularly to certain kinds of natural oils and residues from natural oils, which, prior to the discovery of the process described in my U. S. Patent No. 1,093,098, dated April 14, 1914, had been considered a waste product unfit for use.

When petroleum is produced from the ground, it frequently contains foreign matter. The maximum amount of foreign matter that merchantable petroleum may contain has been established in each oil-producing area by the companies who purchase the oil, the amount being uniform in each area. In some oil fields this amount is one-half of one per cent., ranging as high as three per cent. in those fields where its occurrence is general.

When the amount of foreign matter contained in the petroleum exceeds the maximum percentage established by the purchasing companies, it is considered unmerchantable and must be allowed to settle or must be treated so as to reduce the percentage of foreign matter to or below the limited amount established in the respective fields. Crude oil is usually stored in large earthen or steel storage tanks, and when it is left standing for some time a thick viscous brown substance known as "bottom settlings" settles out of the petroleum to the bottom of the tank and remains therein as a residue when the petroleum is drawn off. This residue or bottom settlings, when examined under a microscope, appears to be an emulsion consisting of a high per cent. of petroleum, organic matter, brine and sometimes mud, and in the oil fields and tank farms, large amounts of these bottom settlings have accumulated, as it is unfit for use and cannot be gotten rid of by allowing it to run into a flowing stream or river, as the laws of States prohibit this on account of the noxious nature of the settlings. The result is that the bottom settlings or residue from oil storage tanks is not only a nuisance and menace, but it also necessitates the expenditure of a great deal of money to store it.

It frequently happens that a well will produce oil, which, as it flows from the well, is so mixed with the substances that constitute bottom settlings, that the oil is unfit for use and in the oil fields is known as "roily oil," this roily oil being essentially similar in its nature and consistency to bottom settlings. In other words, some wells produce an oil known as "roily oil," which is practically the same and has the same characteristics and objectionable features as bottom settlings. I have discovered that the brines of bottom settlings and roily oil are very strong, containing relatively large amounts of calcium and magnesium chlorids, and in some instances bi-carbonates of the alkaline earths, which, together with the organic matter, are apparently the cause of the formation and permanency of bottom settlings and roily oil, the brine and oil having been violently mixed with the organic matter in the operation of pumping the oil from the oil-bearing strata, or from agitation caused by the gas which accompanies the petroleum as it is produced from the ground.

The main object of my present invention is to provide a practicable and inexpensive process for separating practically all of the petroleum contained in bottom settlings and roily oil and rendering such petroleum suitable for commercial use, thereby making use of a waste product that is not only a nuisance and menace, but also a source of great expense. While my present process is intended primarily for the treatment of bottom settlings and roily oil, it can also be used for treating any kind of natural oil and residue from natural oils which contain more or less of the substances that roily oil and bottom settlings are composed of.

I am aware of the fact that it has heretofore been possible to obtain a portion of the petroleum from roily oil and bottom settlings by pumping the same through hot water or through a boiler under which a fire is burning, or heating in tanks by means of steam coils, but such processes do not recover all of the petroleum and in some localities do not recover any petroleum. I am also aware of the fact that sulfuric acid will, in some instances, cause the petroleum to separate from the other substances, but it is not practicable to use sulfuric acid for treating bottom settlings and roily oil, because the acid combines with the petroleum, forming sulfonated oils while attack the iron of tank cars and pipe lines, thus causing oils treated with sulfuric acid to be rejected by the pipe line companies and refineries. It has also been known that soluble salts would remove small amounts of water from oil by increasing its specific gravity, that soluble sulfates in relatively small quantities would serve to separate petroleum from the roily oil and bottom settlings obtained in some localities, and that in the refining of petroleum caustic soda has been used for removing the tarry matters. None of the processes just mentioned, however, have proven satisfactory, for roily oil and bottom settlings and consequently, prior to the discovery of the process described in my prior patent previously referred to, some roily oil and bottom settlings were considered a waste product of no value.

My present process, briefly described, consists in treating bottom settlings, roily oil or any other natural oils or residues from the same of a similar nature, with an agent which partially or completely removes the hardness of the water contained in the bottom settlings or roily oil, by decomposing the salts of lime and magnesia which are held in solution in the water, and thereby softening the water or brine, which agent will hereinafter be referred to as a water-softening agent, thus changing the composition of the mineral salts and isolating the foreign organic matter and leaving the oil free to separate from the water and foreign matter in the natural way, by gravity. I prefer to introduce the water-softening agent into the mixture being treated in solution and under pressure, so as to distribute the water-softening agent thoroughly through the mixture and cause every portion of the mass to be brought into contact with the same, thereby resulting in breaking up the emulsion. I also prefer to apply heat to the mixture or the water-softening agent before, during or after the mixing. Any suitable water-softening agent or mixture of water-softening agents capable of precipitating the alkaline earths present in the emulsion can be used, such, for example, as soluble carbonates alone, or soluble carbonates, silicates and sulfates mixed and made sufficiently alkaline by the addition of a soluble hydrate, soluble soaps alone, or soluble soaps, carbonates and silicates mixed, or oleic acid alone when the brine contains alkaline carbonates in solution, or oleic acid, rosin or the fatty substances from which soaps are made added when the brine of the bottom settlings or roily oil contains alkaline carbonates in solution or has been made alkaline by the addition of a soluble hydrate or carbonate thereto, as may be required for the particular bottom settlings or roily oil which is to be treated. The oil, organic matter and brine of the bottom settlings and roily oil differ somewhat in composition in different localities, so I prefer, in some cases, to use carbonate of soda for treating very old bottom settlings of many years' standing, on account of economy and ease of handling, and a soap made of oleic acid and caustic soda, for treating roily oil of recent production. And in some cases I have found that a mixture of sulfate, carbonate and silicate of soda, or sulfate of soda, made sufficiently alkaline with caustic soda to precipitate the bi-carbonates of the alkaline earth, will treat equally well. In prior processes for separating water from oils by the use of soluble salts, relatively large amounts of the latter have been used, with the object of increasing the specific gravity of the water to such an extent that it will separate from the oil, but in my process, it is only necessary to use relatively small amounts of the water-softening agent, as low indeed, in most cases, as one-tenth of one per cent. of the bottom settlings or roily oil being treated, and furthermore, in most instances the water-softening agent is dissolved in sufficient water so that the specific gravity of the chemical solution is considerably lower than the specific gravity of the brine contained in the bottom settlings or roily oil being treated. In my process, therefore, as distinguished from said old processes, I depend upon the chemical action that the water-softening agent exerts upon the salts of the alkaline earths held in solution in the brine, which results in the oil being liberated from its emulsified state. While in my process it is practicable to use caustic soda in admixture with other water-softening agents above specified, it is not practicable, so far as I have been able to determine, to treat roily oil and bottom settlings with caustic soda alone, as has heretofore been done in the refining of petroleum.

The figure of the drawing is a diagrammatic view illustrating an apparatus that I have devised for practising my process.

In practising the process I intimately mix with the bottom settlings or roily oil being treated a sufficient quantity of carbonate of soda or other suitable water-softening agent, preferably dissolved in water, and heat the mixed mass, usually from 110 to 200 degrees Fahrenheit, until the mass is treated, which is seen by the mass darkening throughout. Usually from 1 to 4 barrels of carbonate of soda is sufficient for 1000 barrels of bottom settlings of long standing, and one-half to one barrel of the oleic acid soap, or other suitable water-softening agent, for 1000 barrels of bottom settlings or roily oil of recent production. Upon standing, the petroleum, which is usually from 30 to 60 per cent. of the total bulk, rises to the top, the brine and mud, if any mud is present, settling to the bottom of the tank and the organic matter forming a thin layer between the brine and the petroleum. Thereafter the mud and brine and the organic matter are drawn off, leaving the petroleum in a marketable condition so that it can be used for fuel or for refining. While I prefer to introduce a water-softening agent into the mixture being treated in a liquid state and under pressure, I have found that when carbonate of soda or any other suitable water-softening agent, either dry or dissolved in water, is allowed to remain in contact with bottom settlings or roily oil, either after warming or not, it will gradually bring about the separation of the petroleum.

Any suitable apparatus can be used for practising my process, but I prefer to use the apparatus herein shown, as it enables the process to be carried out rapidly and economically and also accurately controlled.

Referring to the drawing which illustrates said apparatus, A designates a tank or container for holding the bottom settlings or roily oil, hereinafter referred to as "the mixture which is to be treated". The mixture in the tank A is heated to the desired temperature by means of a steam coil or steam coils B arranged inside of the tank adjacent the bottom of same, and a solution of carbonate of soda or other suitable water softening agent is introduced into the mixture in the tank A by means of a perforated pipe C, said solution of carbonate of soda being drawn out of a supply tank J and forced under pressure through the pipe E to the perforated pipe C by means of a pump D, said pipe E being provided with a controlling valve 4. The chemical solution settles to the bottom of the tank A, carrying with it the brine which has separated from the portions of the bottom settlings or roily oil with which the chemical solution has come in contact. After the supply of chemical solution from the supply tank J has been consumed the valve 1 in the pipe that leads from said supply tank J to the suction side of the pump is closed and the valve 2 in the pipe F that leads from the tank A to the suction side of the pump is opened, so as to cause the chemical solution that has settled to the bottom of the tank A to be drawn out of said tank and pumped up through the pipe E to the perforated pipe C, the mixing being continued for several hours by causing the heated chemical solution to circulate from the bottom of the tank A through the pump and pipe E back to the perforated pipe C. In view of the fact that the chemical solution is under considerable pressure, it will squirt in small streams through the orifices in the pipe C into the mixture in the tank A, thereby causing the chemical solution to come in contact with every portion of the mixture in the tank A. After this operation has been carried on a sufficient length of time to cause the emulsion to break, which is seen by the mass becoming black or dark green on top and the change throughout the mass from a thick viscous to a thin water-like consistency, the supply of steam to the coil B is cut off and the pump D is also stopped. The mass in the tank A is then allowed to stand for from twelve to twenty-four hours, when the petroleum $x$ will have risen to the top, the brine and mud $z$ settled to the bottom and the organic matter $y$ will have formed a thin layer between the petroleum and the mud and brine, as indicated in the drawing.

Instead of applying the heat by a coil arranged inside of the tank A, the heat can be applied by blowing live steam directly into the mixture in the tank A through the perforated pipe C, the apparatus being equipped with a steam supply pipe G connected with the pipe E and provided with a controlling valve 3.

The apparatus herein described forms the subject-matter of my divisional application Serial No. 82,462, filed March 6, 1916, and while I prefer to use said apparatus in practising my process, any method of mixing may be used, so long as it is of such a character that it will result in the carbonate of soda or other suitable water-softening agent being distributed thoroughly through the mixture and brought in contact with all portions of same, the essential feature being that the carbonate of soda or other suitable water-softening agent either dry or in solution, in relatively small amount, be brought in contact with every portion of the bottom settlings or roily oil being treated.

Having thus described my invention, what I claim as new, and desire to secure by Letters Patent, is:

1. A process for treating natural emulsions of petroleum containing petroleum, brine and other organic matter, which consists in intimately mixing with a mass of same a suitable soluble water-softening agent capable of precipitating the alkaline earths present in the emulsion, in an amount relatively small as compared with the brine and other organic matter in the mass, whereby the brine and other organic matter are caused to settle to the bottom and the petroleum to rise to the top of the mass.

2. A process for treating natural oils containing petroleum, water, mineral salts and foreign organic matter, which consists in intimately mixing with a large mass of same, in the presence of heat, in relatively small quantities a suitable water-softening agent capable of precipitating the alkaline earths present in the emulsion, such, for example, as a soluble carbonate, a soluble sulfate, a soluble silicate, a soluble soap, oleic acid, rosin or any of the fatty substances from which soaps are made, or a combination of two or more of the aforesaid chemicals, or a combination of one or more of same with a soluble hydrate, whereby the water, mineral salts, and foreign organic matter in the mass are caused to separate from the petroleum and settle, the petroleum rising to the top of the mass, and thereafter drawing off the petroleum.

3. A process for treating natural oils of the kind described, which consists in introducing into a mass of same a suitable soluble water-softening agent capable of precipitating the alkaline earths present in the emulsion, thoroughly mixing the same with said mass and finally drawing off the separated petroleum from the top of the mass.

4. A process for treating natural mixtures of oil and water, known in the oil fields as "roily oil" and "bottom settlings," which consists in adding to and intimately mixing with a large mass of same a relatively small quantity of a suitable water-softening agent capable of precipitating the alkaline earths present in the emulsion, such, for example, as a soluble carbonate, a soluble sulfate, a soluble silicate, a soluble soap, oleic acid, rosin or any of the fatty substances from which soaps are made, or a combination of two or more of the aforesaid chemicals, or a combination of one or more of same with a soluble hydrate in such proportions as to soften, or partially soften, the brine in the mass, thereby causing the brine to separate from the oil and settle to the bottom, and thereafter drawing off the oil.

5. A process for treating bottom settlings, roily oil and mixtures of similar characteristics, which consists in bringing in contact therewith a suitable water-softening agent or chemical capable of precipitating the alkaline earths present in the emulsion and allowing it to stand until the petroleum separates and rises to the top.

6. A process for treating certain kinds of natural oils and residues from the same, which consists in distributing thoroughly through the material being treated a suitable water-softening agent capable of precipitating the alkaline earths present in the emulsion in solution and utilizing the solution that settles at the bottom of the mass over and over again for mixing with the material until the petroleum in the material separates and rises to the top of the mass.

7. A process for treating bottom settlings and roily oil, which consists in mixing or otherwise bringing into contact therewith a relatively small amount of carbonate of soda or other suitable water-softening agent capable of precipitating the alkaline earths present in the emulsion, either dry or dissolved in water, with or without the application of heat, whereby the petroleum contained therein is caused to separate from the brine and other foreign matter and rise to the top, the brine and other foreign matter settling to the bottom of the mass.

8. A process for treating natural oil mixtures of the kind described, which consists in introducing therein, under pressure, a sufficient quantity of some suitable water-softening chemical capable of precipitating the alkaline earths present in the emulsion, so as to cause the petroleum to separate and rise to the top of the mass being treated.

9. A process for treating bottom settlings and roily oil, which consists in softening the brine in the mixture so as to isolate the foreign organic matter and thus leave the oil free to separate from the water and foreign matter by gravity.

10. A process for treating bottom settlings, roily oil and mixtures of similar characteristics, which consists in thoroughly mixing a suitable water-softening chemical capable of precipitating the alkaline earths present in the emulsion with same by introducing it into the mixture under pressure and in the form of small jets or streams, drawing said chemical out of the receptacle that contains the mixture after the chemical has settled to the bottom of the mass and thereafter introducing the chemical into the mixture and continuing the cycle of operations until the mixture has been treated sufficiently to cause the petroleum to separate and rise to the top of the mass after the mass stands for some time.

11. A process for treating bottom settlings, roily oil and similar mixtures, which consists in thoroughly distributing a suitable water-softening chemical capable of precipitating the alkaline earths present in the emulsion through the mixture while it is heated and in a state of agitation.

In testimony whereof I hereunto affix my signature in the presence of two witnesses, this sixteenth day of November 1914.

WILLIAM S. BARNICKEL.

Witnesses:
WELLS L. CHURCH,
GEORGE BAKEWELL.